Dec. 18, 1928.  1,695,336
G. N. KOHLHAAS
MICROMETER
Filed March 4, 1927
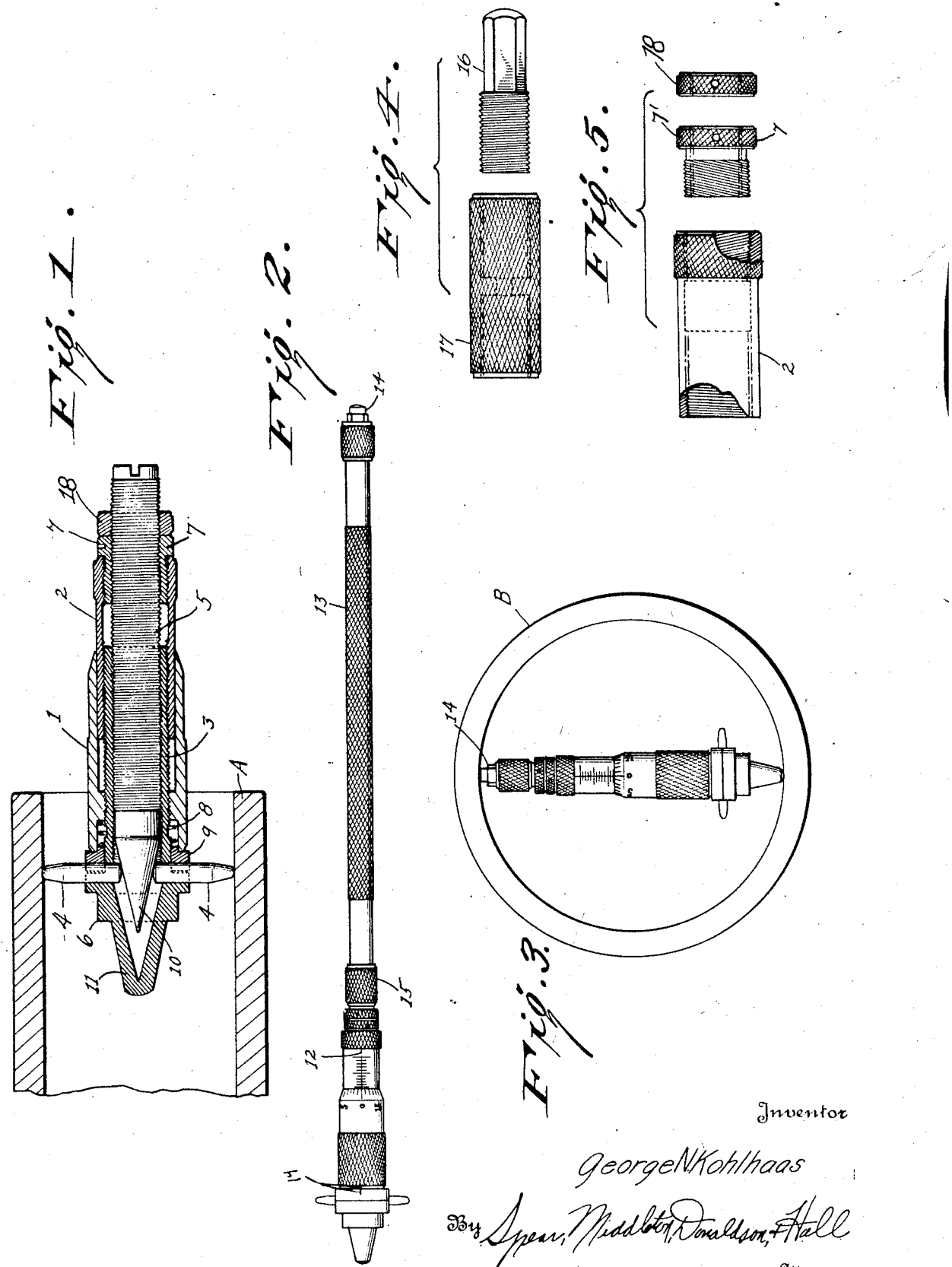
Inventor
George N Kohlhaas
By Spear, Middleton, Donaldson, & Hall
Attorney Patented Dec. 18, 1928.

1,695,336

UNITED STATES PATENT OFFICE.

GEORGE N. KOHLHAAS, OF ELMIRA, NEW YORK.

MICROMETER.

Application filed March 4, 1927. Serial No. 172,898.

The invention relates to improvements in micrometer gages of the type adapted to measure to a high degree of accuracy, the interior diameter of metal tubes and bores.

An object of the present invention is to provide a device adapted to be used for measuring in two different ways whereby it is capable of measuring tube and boring diameters of widely varying size.

Another object is to provide a micrometer by which measurements may be taken either at the mouth of a tube, or boring, or at a considerable distance within said tube.

A further object is to provide for use with the micrometer device proper of a series of interchangeable pin members for measuring diameters up to a certain length, and a series of extensions for measuring diameters beyond the said certain diameter.

The invention comprises the features, combination, and arrangement of parts hereinafter described and particularly pointed out in the claims.

In the drawings

Fig. 1 is a sectional view of the micrometer, and

Fig. 2 is a side elevation of the same with a handle extension attached.

Fig. 3 shows the micrometer in measuring position with its ends used as contacts.

Fig. 4 is a view of a detail of the invention.

Fig. 5 shows the quadruple thread on the handle 7 and sleeve 2.

Referring by reference characters to the figures, the letter A in Fig. 1 indicates the end of a tube, the diameter of which is to be measured, as does also the letter B in Fig. 3.

The measurement of the diameter of A in Fig. 1 is accomplished by means of pins 4 which are guided as hereinafter described in a head 6 and are forced outward to cause their outer ends to contact with the inner wall of the tube, by a cone 10, which is moved longitudinally by screw means hereinafter described. The head 6 is carried at the end of a tubular body 3 forward and the forward end of the head is of conical shape as shown at 11, and provides an internal recess to receive the cone 10. The pins 4 pass through openings in the body 3 and bear at the front in radial grooves of semi-circular cross-section in the enlarged portion or flange of the head 6. A movable washer 9 encircles the plain portion of the body 3 and coacts with the head 6 in holding the pins in place, the washer being provided with pin engaging radial grooves corresponding to those in the head.

A helical spring 8 encircles the plain portion of the body 3 in rear of the washer 9 and presses the washer up against the pins 4. The spring is compressed between the washer 9 and a combination lock nut and thimble 1 which is threaded onto tubular body 3. The combination lock nut and thimble 1 has a recessed portion so that it overlaps the spring and excludes dirt, this overlapping portion overlapping a small flange of the washer 9.

The lock nut 1 is adapted to be screwed up against the washer 9 so as to force the latter tightly against the pins to hold them from slipping out, but not to clamp them against radial movement such as is imparted by the cone 10. The member 1 and washer 9 are provided with marks 19 adapted to register with each other so that the member 1 will always be tightened to the same amount before taking a reading, since the member 1 is the micrometer thimble as well as a lock nut, and so must be always established in the same position before accurate readings can be obtained by movement of the barrel 2, hereinafter described, relative thereto.

If it is desired to replace the pins 4 by a different set, the member 1 is slightly unscrewed, which relieves the washer 9 from the strong clamping action of the member 1, but yet leaves the spring 8 sufficiently compressed to exert enough pressure on the washer 9 to keep the pins from dropping out, although they may be readily removed and replaced by hand.

The tubular body 3 is threaded internally and externally in rear of the spring abutment on the member 1 the inner threads engage corresponding threads on the screw threaded stem 5, which carries the cone 10. The external threads engage corresponding threads on the member 1 and on a barrel member 2. The barrel member is secured to the screw 5, as hereinafter described, and carries the screw 5 forward or backward as the barrel is screwed forward or backward on the body 3. The barrel 2 is secured to screw 5 by having reverse or left hand spiral quadruple threads in its rear end which engage corresponding reverse threads formed on a nut 7' which is screwed onto the screw 5 adjacent its rear end and is locked in position by lock nut 18, and the barrel 2 is then screwed up on the nut 7' until it abuts a knurled handle 7 integral with the nut 7' at its rear end.

This arrangement provides a locking feature, the barrel 2 also acting as a lock nut in conjunction with the knurled handle 7 which for purposes of operation may be regarded as integral with screw 5. The barrel 2 having both right and left hand threads thereon, the instrument can readily be locked by holding the barrel with one hand and turning the handle 7 clockwise with the other. This locks the quadruple threads of the screw member 5 against the quadruple threads of the barrel 2 and locks the right hand threads of barrel 2 and the right hand threads of screw 5 against the threads of the body 3, thus locking the whole instrument. The reason for this locking action is the opposition of the quadruple thread action to that of the right hand threads, thus locking all of the threads. To release, the head and pins are held with one hand, and the handle turned anti-clockwise with the other. The rotary movement of handle 7 relative to the barrel 2 is very slight, there being but a very small arc traveled between locked and unlocked position. The locked position locks the instrument, but the unlocked position locks the handle 7 and barrel 2 together sufficiently to permit rotation of the barrel by the handle. The quadruple thread will lock the instrument firmly enough for all practical purposes, but not so firmly that it cannot be released by a simple twisting motion. The locking feature of the right and left hand combination barrel and lock nut also serves the purpose of taking care of wear in the micrometer by eliminating the necessity of readjustment of parts.

The barrel 2 has a line 12 thereon with graduations thereon running from zero upward toward the rear end. The rearward end of the thimble 1 is tapered to a comparatively thin edge and its diameter is such that it loosely fits around the exterior of the barrel 2. The tapered edge has graduations which are suitably numbered around its periphery. In operation, if it is desired to determine the interior diameter of the tube shown in Fig. 1, a suitable set of pins 4 is inserted, and the thimble 1 is turned up against the washer 9 until the corresponding marks coincide. If locked, the device is unlocked by turning the handle 7 counter clockwise and then the barrel 2 may be readily turned clockwise by the handle or by itself until the pins 4 are extended to contact with the inner periphery of the tube, when the instrument may be locked in position and a reading taken. For measuring the diameter at a considerable distance within the tube a handle extension, such as shown at 13 in Fig. 2, and hereinafter described, is used to permit insertion of the micrometer to the desired position in the tube. In this case the instrument must be repeatedly set and inserted until the proper setting or reading is arrived at. The locking feature is especially useful in this case since the instrument may be locked in set position before insertion and thus eliminate liability of the setting being changed either in insertion or removal.

The measurement of the diameter of B in Fig. 3 is accomplished by using the ends of the instrument as contact members. The rounded end of the cone 11 serves as one contact and a cap 14, Fig. 3, is screwed onto the other end of the instrument and serves as the other contact. A series of extensions of varying lengths, such as shown in Fig. 2, is used in connection with the instrument for measuring widely varying diameters.

In the use of the instrument in this way the diameter of the tube at the mouth may be measured by holding the instrument diametrically across the mouth of the tube, and turning the barrel 2, to which contact cap 14 is attached, relative to the thimble 1 to which the other contact is connected, until the contacts engage the inner periphery of the tube. When it is desired to lengthen the instrument to measure a relatively large diameter in this way, the cap 14 is removed and a suitable extension such as 13 in Fig. 2 is interposed between it and the micrometer.

The extension is threaded at each end and is provided with a coupling collar 15 which is internally screw threaded to engage the threads of the extension and those of the end of the micrometer in forming the coupling. The cap 14 is then screwed upon the free end of the extension. Obviously one or more extensions may be added one to the other by means of collar 15.

One of the coupling collars 15 is of the form shown at 17 in Fig. 4 and has a rounded plug 16 screwed in it and having two flat sides. By means of the screw plug 16 the length of the micrometer may be adjusted to compensate for any wear which may take place between the threadedly connected parts of the micrometer proper, or in its end contacts or in its extension connections, so that accuracy of readings may be assured at all times when the ends of the instrument are used as contact members. The screw plug 16 is adapted to be used as a contact point in place of cap 14.

It will be readily seen that by employing a number of sets of pins 4 and a series of extensions, any diameter up to two feet or more may be accurately measured.

The nut 7' being screwed upon the screw 5 and locked to take care of any wear which may take place in the operative threadedly connected parts of the micrometer, so that accuracy of readings of diameters may at all times be assured.

I claim:

1. In combination in a micrometer gage, a tubular body portion having a head with radial guide grooves thereon, a washer having corresponding guide grooves opposing said first mentioned grooves, pins guided in said grooves, means for pressing the washer against the pins, said means comprising a combination lock nut and micrometer thimble, and means for forcing the pins outwardly.

2. In combination, an interiorly and exteriorly threaded tube, radially arranged pins at the forward end thereof, a cone extending between said pins and having a threaded stem extending rearwardly through the tube in threaded engagement therewith and to a point beyond the opposite end thereof, an interiorly threaded barrel connected to the rear end of said stem and having its interior threads engaged by the exterior threads of said tube, and an interiorly threaded thimble having its interior threads engaged by the exterior threads of said tube, said thimble extending rearwardly beyond its threaded portion to overlie the said barrel, said barrel and the rearward end of said thimble being provided with graduations.

3. In combination, in a micrometer gage, an interiorly and exteriorly threaded tube, radially movable pins at the forward end thereof, a cone extending between said pins and having a threaded stem engaging the interior threads of said tube and extending rearwardly through the tube and to a point beyond the opposite end thereof, an interiorly threaded barrel receiving said stem and connected at its rear end to the rear end of the stem whereby said barrel extends forwardly over the stem from its connection therewith, the interior threads at the forward end of the barrel engaging the threaded rear end of the tube, and an interiorly threaded thimble having its interior threads engaged by the exterior threads of said tube, said thimble extending rearwardly beyond its threaded portion to overlie said barrel.

4. In combination, an interiorly and exteriorly threaded tube, radially movable pins at the forward end thereof, a cone extending between said pins and having a threaded stem engaging the interior threads of said tube and extending rearwardly through said tube and to a point beyond the opposite end thereof, said stem having an enlargement at its rear end provided with a left hand quadruple thread, and a second enlargement beyond and rising from the first and forming a knurled handle; an interiorly threaded combination barrel and lock nut being threaded at its forward end to engage the exterior threads of said tube and having at its rear end a left hand quadruple thread to engage the quadruple thread of the stem, said handle forming a stop for said combination barrel and lock nut when the latter is screwed on to the stem by the quadruple thread, and said handle being capable of slight turning movement relative to the lock nut when the lock nut is in engagement with the threads on the tube, to lock the stem and lock nut against movement, and an interiorly threaded thimble having its threads engaged by the exterior threads of said tube, said thimble extending rearwardly beyond its threaded portion to overlie said combination barrel and lock nut.

5. In combination in a micrometer gage, a tube, radially arranged pins at the forward end thereof, a cone extending between said pins and having a threaded stem extending rearwardly through and beyond said tube to engage with a combination micrometer barrel and lock nut whereby the stem and barrel may be locked together and against turning, and a combination micrometer thimble and pin lock nut adapted to hold the pins in radially movable position, and to cooperate with said micrometer barrel.

6. In combination, a tubular body portion having at its forward end a flanged head with semi-circular recesses in said head, a washer having corresponding semi-circular recesses opposing said first mentioned recesses, pins guided in said recesses, said tubular body being interiorly and exteriorly threaded, a cone extending between said pins and having a threaded stem engaging the interior threads of said tube and extending rearwardly through and beyond said tube, an interiorly threaded barrel receiving said stem and connected at its rear end to the rear end of the stem whereby said barrel extends forwardly over the stem from its connection therewith, the interior threads at the forward end of the barrel engaging the threaded rear end of the tube, an interiorly threaded combination lock nut and thimble having its threads engaged by the exterior threads of said tube, said thimble extending rearwardly beyond its threaded portion to overlie said barrel, said combination locknut and thimble having a portion extending forwardly from its threaded portion and providing a recess between it and said tube, a spring in said recess between said lock nut and said washer, said forwardly extending portion of said lock nut being adapted to engage said washer to hold the pins in radially movable position, said spring being adapted to hold said pins when the lock nut is disengaged from said washer.

7. In combination in a micrometer gauge, a tubular body portion having at its forward end a flanged head with semi-circular recesses in said head, a washer having corresponding semi-circular recesses opposing said first mentioned recesses, pins guided in said recesses, said tubular body being interiorly and exteriorly threaded, a cone extending between said pins and having a threaded stem engaging the interior threads of said tube and extending rearwardly through and beyond said tube, said stem having an enlargement at its rear end provided with a left hand quadruple thread, and a second enlargement beyond and rising from the first and forming a knurled handle, an interiorly threaded combination barrel and lock nut being threaded at its forward end to engage the exterior threads of said tube and having at its rear end a left hand quadruple thread to engage the quadruple thread of the stem, said handle forming a stop for said combination barrel and lock nut when the latter is screwed onto the stem by the quadruple thread, said handle being capable of slight turning movement relative to said combination barrel and locknut, when the same is in engagement with the threads on the tube, to lock the stem and barrel against movement, an interiorly threaded combination pin lock nut and thimble having its threads engaged by the exterior threads of said tube, said thimble extending rearwardly beyond its threaded portion to overlie said barrel, said combination lock nut and thimble having a portion extending forwardly from its threaded portion and providing a recess between it and said tube, a spring in said recess between said thimble and said washer, the forwardly extending portion of said thimble being adapted to engage said washer to hold the pins in radially movable position, said spring being adapted to hold said pins, when the lock nut is disengaged from said washer.

8. In combination in a micrometer gage, a tube, radially movable measuring pins mounted at one end of said tube, means for actuating said pins, locking means for holding said pins in radially movable position, comprising a micrometer thimble, and locking means for preventing the pin actuating means from moving.

9. In combination in a micrometer gage, a tube, said tube having a head at its forward end, and said head having a hollow conical portion extending forward therefrom, radially movable pins mounted in said head, a pin actuating stem having threaded engagement with the interior of said tube, and having a conical end for engagement with the pins, said hollow conical member being adapted to receive the conical end of said stem, said stem having at its opposite end a handle and an exteriorly threaded end, a cap adapted to be screwed upon said threaded end, a series of extension members having their ends threaded and coupling collars for connecting said extension members with themselves, or with said stem, whereby the length of the micrometer can be adjusted by the insertion or removal of one or more extensions between the threaded end of the stem and the said cap.

10. In combination in a micrometer gage, a tube, radially removable pins at the forward end thereof, a cone extending between said pins and having a stem extending rearwardly through and beyond said tube in threaded engagement therewith, said stem having at its rear end a left-handed threaded portion, a barrel having a left-handed thread at its rear end in engagement with the left-handed thread on the stem and having a thread at its forward end in threaded engagement with the exterior of the tube, and a thimble secured to said tube and adapted to cooperate with said barrel.

11. In a device according to claim 10, said stem, when screwed into the barrel to the limit of the left-handed thread, being adapted to permit relative screw turning movement between the stem and barrel as one unit and the tube and thimble as the other unit of the micrometer, and said stem being also adapted, when slightly unscrewed from the barrel, to lock the whole instrument.

In testimony whereof I affix my signature.

GEORGE N. KOHLHAAS.